(12) United States Patent
    Cacioppo

(10) Patent No.: US 9,185,990 B2
(45) Date of Patent: Nov. 17, 2015

(54) BI-DIRECTIONAL BED RAIL ASSEMBLY

(71) Applicant: Gary Cacioppo, Seffner, FL (US)

(72) Inventor: Gary Cacioppo, Seffner, FL (US)

( * ) Notice: Subject to any disclaimer, the term of this patent is extended or adjusted under 35 U.S.C. 154(b) by 219 days.

(21) Appl. No.: 14/018,583

(22) Filed: Sep. 5, 2013

(65) Prior Publication Data

US 2015/0059090 A1    Mar. 5, 2015

(51) Int. Cl.
    *A47C 19/02*    (2006.01)
    *A47C 19/00*    (2006.01)
    *A47C 17/86*    (2006.01)
    *A47C 19/04*    (2006.01)

(52) U.S. Cl.
    CPC .............. *A47C 17/86* (2013.01); *A47C 19/005* (2013.01); *A47C 19/025* (2013.01); *A47C 19/045* (2013.01); *A47C 19/021* (2013.01)

(58) Field of Classification Search
    CPC ...... A47C 19/00; A47C 19/005; A47C 19/02; A47C 19/021; A47C 19/022; A47C 19/024; A47C 19/025
    USPC ............... 5/286, 279.1, 282.1, 285, 288, 296, 5/200.1, 201
    See application file for complete search history.

(56) References Cited

U.S. PATENT DOCUMENTS

| 37,560 | A | 2/1863 | Babcock |
|---|---|---|---|
| 90,329 | A | 5/1869 | Wing |
| 691,427 | A | 1/1902 | Williams |
| 795,947 | A | 8/1905 | Upton |
| 809,447 | A | 1/1906 | Jones |
| 834,462 | A | 10/1906 | Faught |
| 860,224 | A | 7/1907 | Mellon |
| 1,031,216 | A | 7/1912 | Warner et al. |
| 1,274,802 | A | 8/1918 | Spiegel |
| 1,424,284 | A | 8/1922 | Dyke |
| 1,617,865 | A | 2/1927 | Richardson |
| 4,340,984 | A | 7/1982 | Marcyan |
| 5,365,623 | A | 11/1994 | Springer |
| 6,349,435 | B1 | 2/2002 | Mitchell |
| 2015/0059090 | A1* | 3/2015 | Cacioppo ......................... 5/286 |

OTHER PUBLICATIONS

Please see the ISR for related PCT App. No. US/2014/053068 included herewith as Exhibit A.

* cited by examiner

*Primary Examiner* — Robert G Santos
(74) *Attorney, Agent, or Firm* — Jeremy A. Smith; John Smith T.; Bradley Arant Boult Cummings LLP

(57) ABSTRACT

The present application provides a hook assembly having a latitudinal axis bisecting a body into an upper portion above the latitudinal axis further comprising a first bi-directional pin engagement slot and a lower portion below the latitudinal axis further comprising a second bi-directional pin engagement slot, wherein both the upper portion and the lower portion and the first bi-directional pin engagement slot and the second bi-directional engagement slot are mirror images of one another.

15 Claims, 6 Drawing Sheets

BI-DIRECTIONAL BED RAIL ASSEMBLY

FIELD OF THE DISCLOSURE

The present disclosure relates generally to hooks (or brackets) that secure a bed rail 28 to a bedpost 34. More specifically, the present disclosure relates to a hook assembly 2 having a plurality of bi-directional pin engagement slots 4 which facilitate the adjustment of mattresses to a desired level and accommodate mattresses of different thicknesses.

BACKGROUND

Conventional beds comprising a mattress and box-springs are typically supported using one of two types of support structures. One type is a rectangular frame, which is typically metal, that supports the box-springs on all sides, which comprises four angle-iron members and a leg at each corner. Such frames sometimes also include a cross member with a fifth leg to provide centering support. A headboard and footboard may be connected to the frame but do not provide any support for the mattress in this arrangement. A second type of bed support structure that is used consists of two bed rails attached to and extending between a footboard and a headboard, the rails each having a fixed member extending inwardly to enable support for the box-springs and mattress positioned there between. It will be appreciated that sometimes, the fixed members receive the box-springs and sometimes a plurality of rigid supports—such as wood planks—are placed on the fixed members and which then provide the support surface for hosting the box-springs and mattress. The bed rails are elongated members that include a hooking means at each end configured to mate with a receptacle located in the headboard and footboard. It will be appreciated that one common means for engaging the bed rails with the bed ends are hooks affixed at the end of the bed rails which engage horizontal pins disposed in vertical slots located in legs (or bedposts) of the headboard and footboard. In this arrangement, the footboard and headboard actually support the bed rails and therefore the mattress. It will be appreciated that this standard support mechanism has limitations, however, including providing the bed user with sufficient options for raising or lowering the bed rails in order to adjust to various sized mattresses or to meet the height preferences of the user.

There are many types of box-springs and mattresses available to the consumer. One important variable that distinguishes mattress units is thickness. Additionally, some mattresses do not require the use of box springs. Accordingly, it is desirable to have a new hook assembly 2 that allows a user to raise or lower the height of the mattresses depending upon the thickness of the mattress and the height preference of the user. Such a hook assembly 2 is disclosed herein.

BRIEF DESCRIPTION OF THE DRAWINGS

To further illustrate the advantages and features of the present invention, a more particular description will be rendered by reference to specific embodiments thereof which are illustrated in the appended drawings. It is appreciated that these drawings are not to be considered limiting in scope. The invention will be described and explained with additional specificity and detail through the use of the accompanying drawings in which.

SUMMARY OF THE DISCLOSURE

Figure 1:
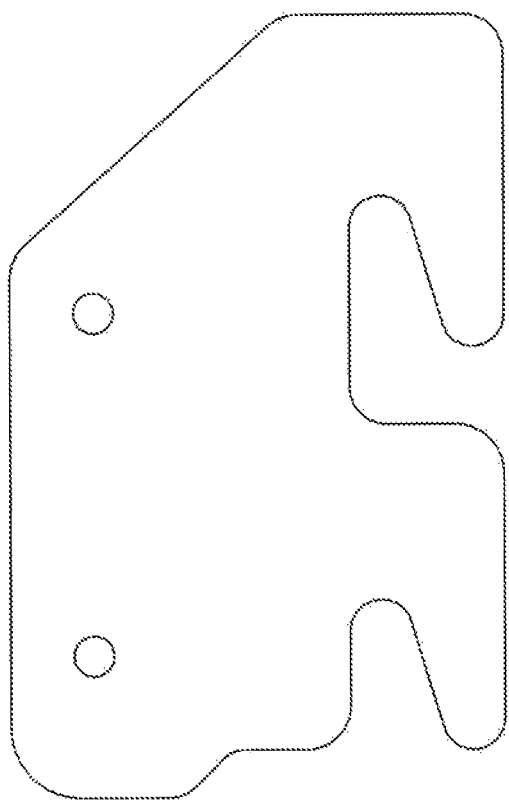
FIG. 1 shows one embodiment of a prior art bed rail hook.

In a first aspect, the present disclosure provides hook assembly comprising a latitudinal axis bisecting a body into an upper portion above the latitudinal axis further comprising a first bi-directional pin engagement slot and a lower portion below the latitudinal axis further comprising a second bi-directional pin engagement slot, wherein both the upper portion and the lower portion and the first bi-directional pin engagement slot and the second bi-directional engagement slot are mirror images of one another.

In a second aspect, the present disclosure provides a bed comprising a bed rail attached to a hook assembly, said hook assembly further comprising a plurality of bi-directional pin engagement slots each comprising an upper interior slot and a lower interior slot, wherein said upper and lower interior slots are formed on either side of an apex extending from a body.

In a third aspect, the present disclosure provides a bed rail attached to a hook assembly, said hook assembly comprising a latitudinal axis bisecting a body into an upper portion above the latitudinal axis further comprising a first bi-directional pin engagement slot and a lower portion below the latitudinal axis further comprising a second bi-directional pin engagement slot, wherein both the upper portion and the lower portion and the first bi-directional pin engagement slot and the second bi-directional engagement slot are mirror images of one another.

DETAILED DESCRIPTION

The corresponding structures, materials, acts, and equivalents of all means or step plus function elements in the claims below are intended to include any structure, material, or act for performing the function in combination with other claimed elements as specifically claimed. The description, of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments herein were chosen and described in order to best explain the principles of the disclosure and the practical application, and to enable others of ordinary skill in the art to understand the disclosure for various embodiments with various modifications as are suited to the particular use contemplated. As used herein, the singular forms "a", "an" and "the" are intended to include the plural forms as well, unless the context clearly indicates otherwise. Further, as used herein, the term "approximately" or "approximate" means reasonably close to the quantity or quality being described as would be understood by one skilled in the art.

Hook Assembly 2

The hook assembly 2 of the present disclosure provides a novel and useful way of adjusting the height of a mattress support 30 affixed to a bed rail 28 to accommodate mattresses of varying thickness. For example, in one position the mattress support 30 might be suitable for use with a traditional box spring and mattress while in a different position the mattress support 30 might be suitable for use with a memory foam mattress which doesn't require the use of a box-spring. Regardless of the mattress set used, the new assembly provides the user with options for adjusting the overall height of the bedding.

Now referring to FIGS. 2-6, one embodiment the hook assembly 2 of the present invention comprises a plurality of bi-directional pin engagement slots 4 located on opposite sides of a extension 16 (preferably t-shaped) and a body 24 that are formed from a flat sheet or rigid material, preferably metal. In one embodiment, the plurality of bi-directional pin engagement slots 4, t-shaped extension and a body 24 are integrally formed (i.e., one piece).

Figure 2:
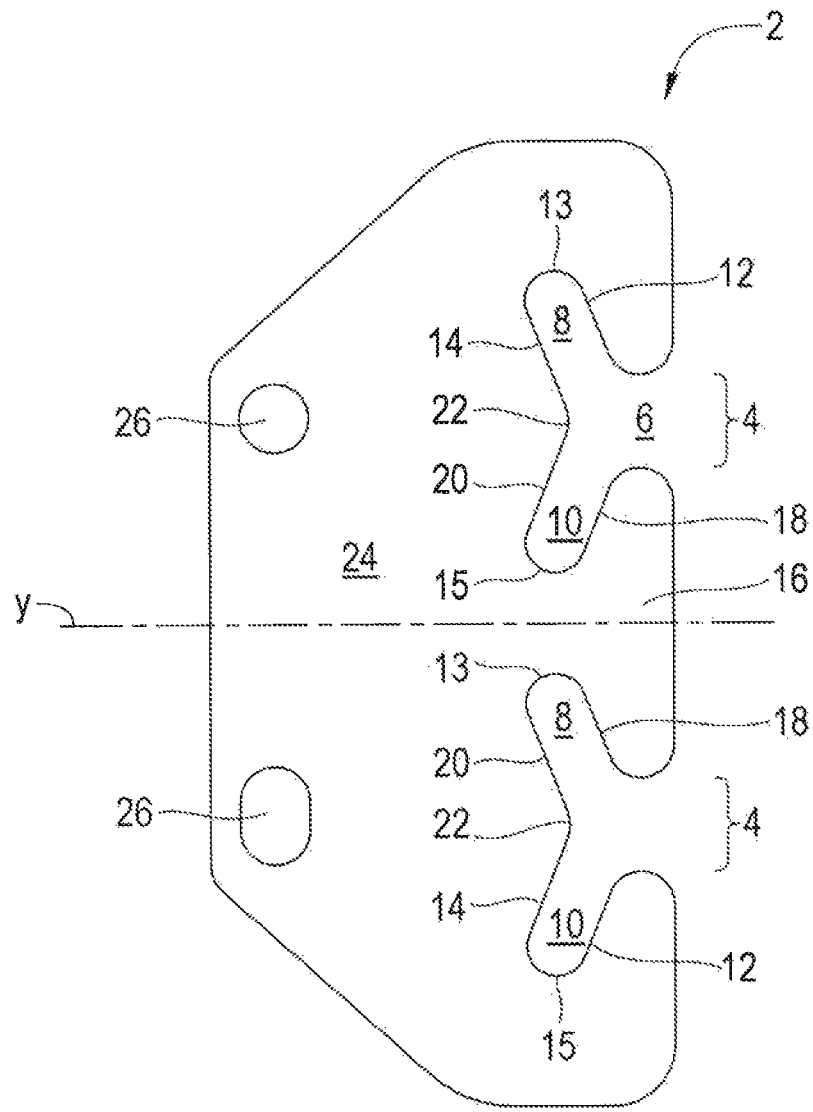
FIG. 2 shows a side view of one embodiment of the hook assembly 2 disclosed herein.
Figure 6:
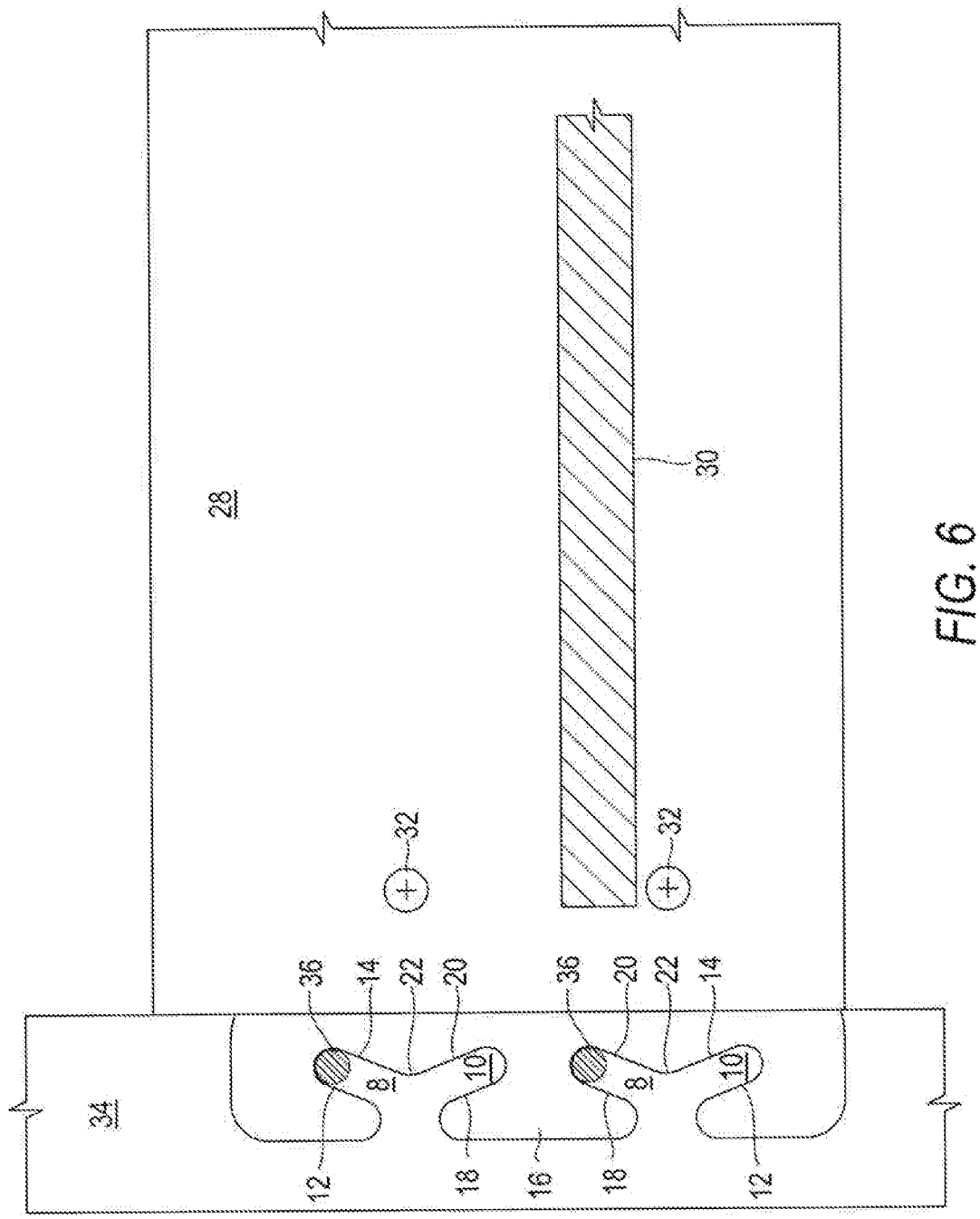
FIG. 6 shows a side cut-away view of a bed rail 28 attached to a bedpost 34 using one embodiment of the hook assembly 2 disclosed herein.

In one embodiment, the bi-directional pin engagement slots 4 further comprise a central opening 6 through which a pin 36 located on the interior of a bedpost 34 can pass and engage either an upper interior slot 8 or, depending on the orientation of the bed rail (as described further below), a lower interior slot 10 as shown in FIG. 6. Now referring specifically to FIG. 2, the bi-directional pin engagement slots 4 are generally located on opposite sides of a t-shaped extension 16. Each of the bi-directional pin engagement slots 4 are mirror images of one another (i.e., the bi-directional pin engagement slot 4 located on a first side of the t-shaped extension 16 is the mirror image of the bi-directional engagement slot 4 located on a second side of the t-shaped extension 16). In one embodiment, the hook assembly can be divided about line y, as shown in FIG. 2, and the resulting halves are mirror images of one another.

Each bi-directional pin engagement slot 4 comprises an upper interior slot 8 and a lower interior slot 10. In one embodiment, the central opening 6, upper engagement slot 8 and the lower engagement slot 10 are in continuous contact so that a pin 36 may pass through the central opening 6 and then be guided into either the upper interior slot 8 or the lower interior slot 10, depending upon the orientation of the bed rail 28 (as described below).

Generally, the upper engagement slot 8 located on the upper portion of the hook assembly 2 comprises a close-ended construction wherein one side of the slot is bounded by an outer distal boundary 12, the opposite side of the slot is bounded by an inner distal boundary 14 and the closed end of the slot is bounded by the terminus 13. As noted, the upper engagement slot 8 located in the bottom portion of the hook assembly 2 is fashioned in the same manner as slot 8 located in said upper portion.

Generally, the lower engagement slot 10 located on the upper portion of the hook assembly 2 comprises a close-ended construction wherein one side of the slot is bounded by an outer central boundary 18 to enable sufficient restraint by said locking pin when the bed rail is engaged in the reverse orientation. It will be appreciated by viewing FIG. 2 that extension 18 forms the upper section of t-shaped protrusion 16. In the preferred embodiment, upper engagement slot 8 and lower engagement slot form a continuous receptacle formed by interior boundaries 14 and 20 separated generally by raised portion 22.

In one embodiment of the hook assembly 2, the upper engagement slot 8 and the lower engagement slot 10 are separated by an apex 22 that extends from the body 24 generally towards the central opening 6.

The hook assembly further comprises the body 24 that includes one or more apertures 26. As shown in FIGS. 3-6, the body 24 engages the bed rail 28. In an embodiment where there is a plurality of apertures 26, the apertures 26 may be identical in size and shape or they may be different sizes and shapes. In one embodiment, the body 24 fits into a slot or dado on the bed rail 28 and is secured to the bed rail 28 via fasteners 32 inserted through the apertures 26. The fasteners may be any suitable variety or means known to one of ordinary skill in the art including without limitation brads, bolts or screws.

The hook assembly 2 may be formed of a unitary piece of flat metal. The hook assembly 2 may be formed by many different methods generally known to one of ordinary skill in the art including being stamped from a metal sheet, being cut from a flat metal sheet (either using saws or a CNC machining process) or east from molten metal,

Use

Once formed and attached to the bed rail 28 as described above, the hook assembly 2 is configured to engage pins 36 located on the interior of a bedpost 34. Generally, and with reference to FIGS. 3-6, bed rails 28 comprise a slot on one face of the bed rail 28 which exposes the pins 26. The hook assembly 2 is configured to slidingly engage the slot and then the pins 36. During the process of engaging the pins 36, the pins 36 will pass through the central openings 6 and may contact the apex 22, then the hook assembly 2 is lowered such that the pins 36 fit into either the upper engagement slot 8 or the lower engagement slot 10 as the case may be (see below) and eventually come to rest against the terminus 13 or terminus 15. This step is repeated for connecting the bed rail 28 to the bedpost 34 of the headboard and the footboard of a bed. The resulting bed rail 28/headboard/footboard structure is typically either a rectangle or a square for supporting a mattress.

Figure 3:
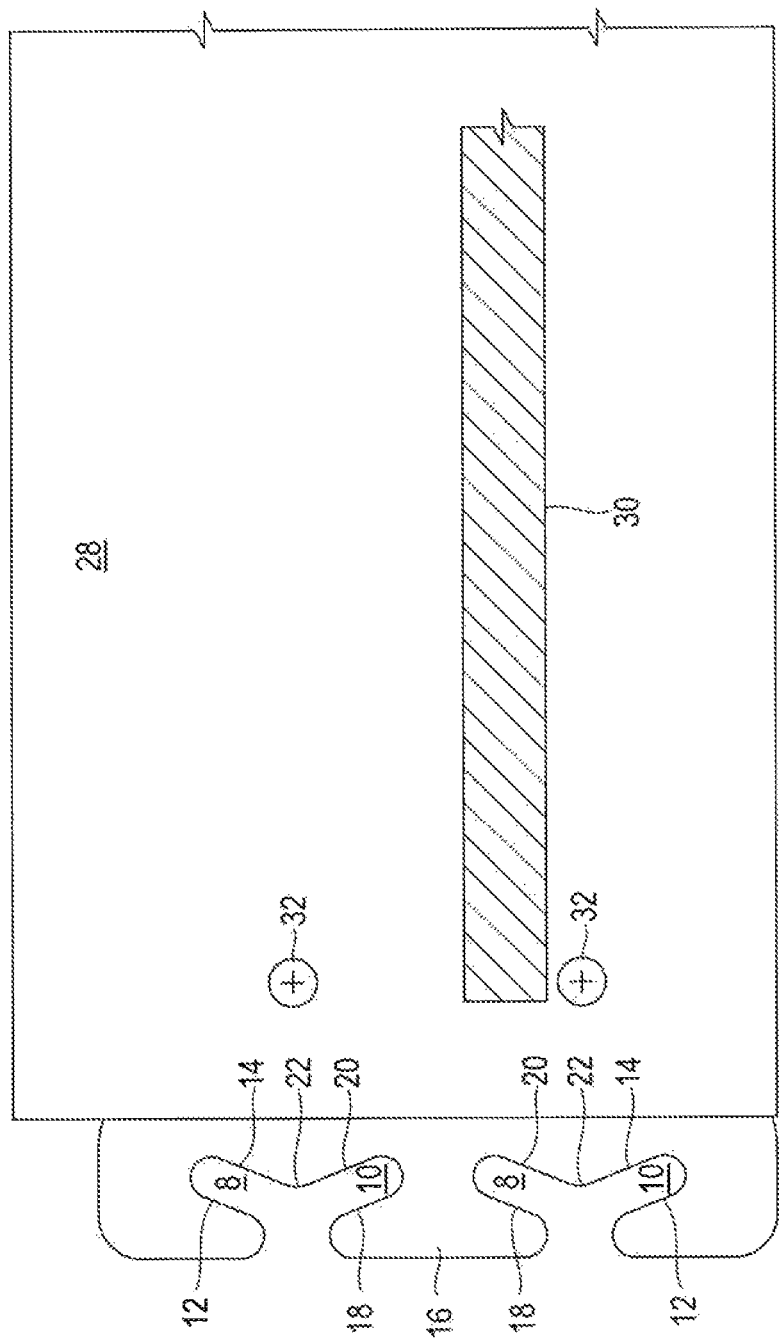
FIG. 3 shows a side view of one embodiment of the hook assembly 2 disclosed herein attached to a bed rail 28.
Figure 4:
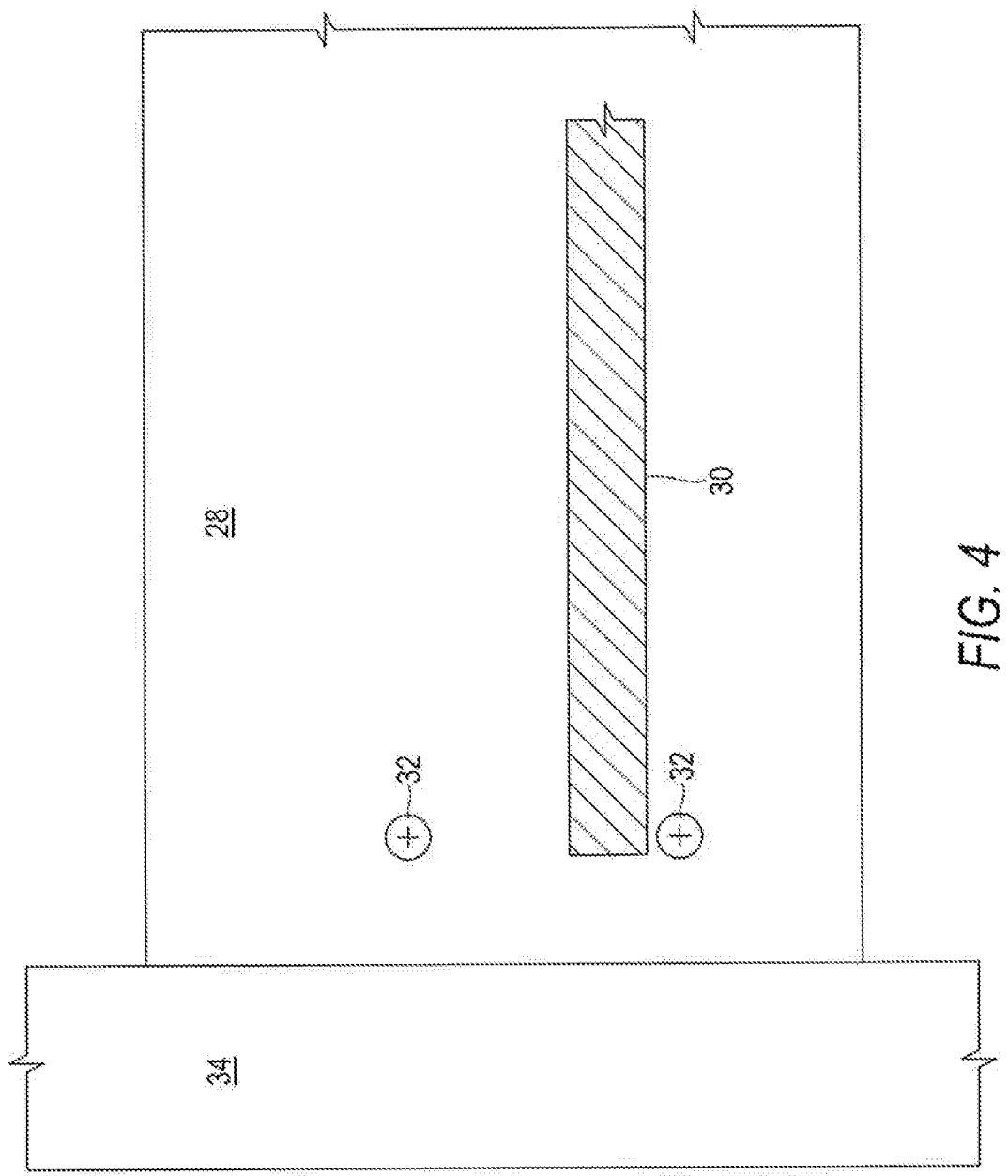
FIG. 4 shows a bed rail 28 attached to a bedpost 34 using one embodiment of the hook assembly 2 disclosed herein, wherein the mattress support 30 is in a lower first position.
Figure 5:
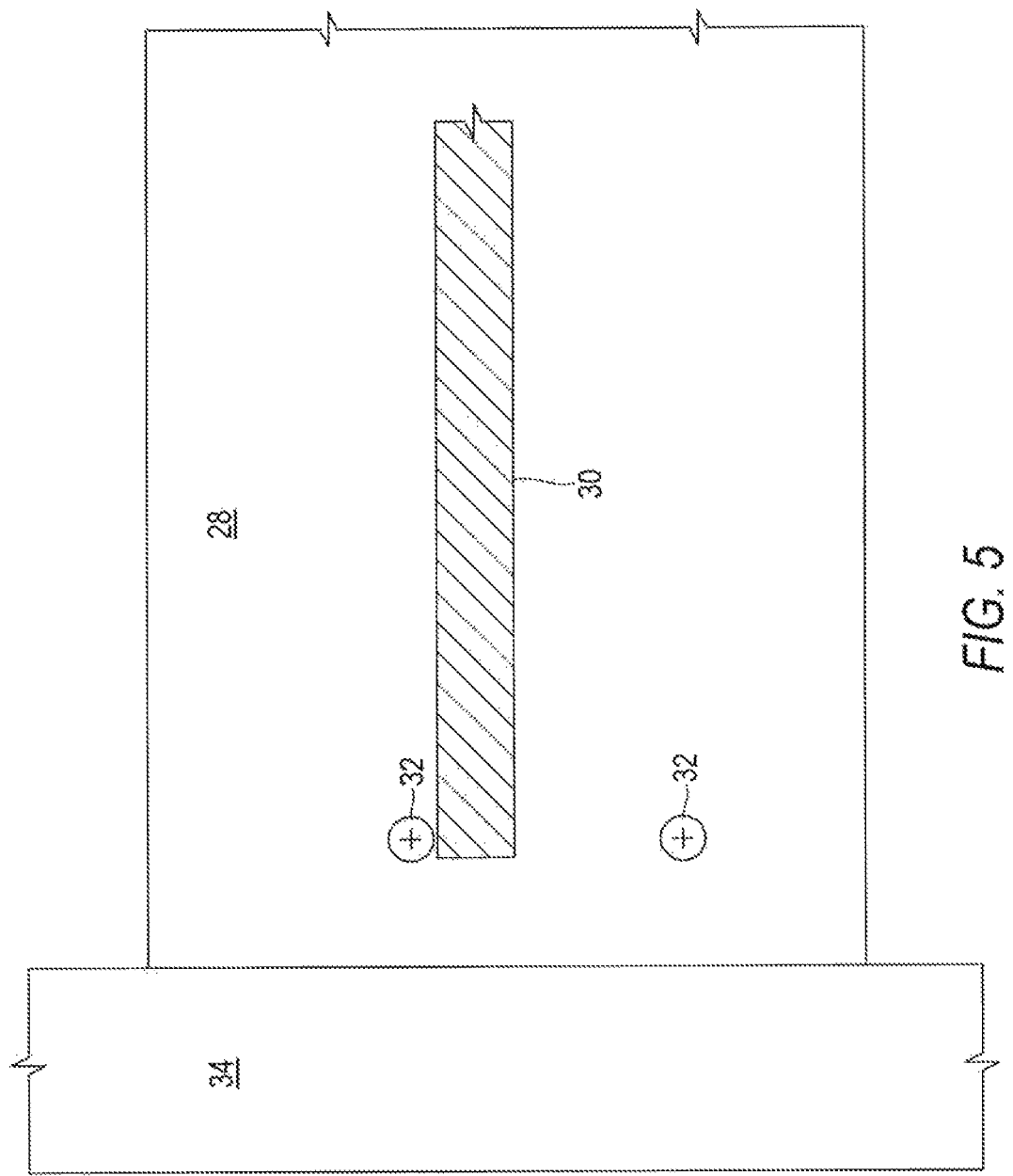
FIG. 5 shows a bed rail 28 attached to a bedpost 34 using one embodiment of the hook assembly 2 disclosed herein, wherein the mattress support 30 is in an upper second position.

With the bed rail 28/headboard/footboard structure assembled, the mattress supports 30 on the inside face of the bed rail 28 will either be in a first lower position or a second upper position (compare FIGS. 3 and 4). The position of the mattress support 30 depends in large part on the thickness of the mattress in use and whether or not the mattress is supported by a box spring or slats laid horizontally across the bed rail 28/headboard/footboard structure. If a box spring is in use, then it may be desirable to have the mattress support 30 in the lower first position. If a box spring is not in use, then it may be desirable to have the mattress support in the second upper position.

If a consumer desires to switch from a box spring supported mattress to a slat supported mattress (or vice versa), it would be desirable to alter the position of the mattress support 30. That alteration can be quickly and easily accomplished using the hook assembly 2 described herein.

First, the consumer would disassemble the bed rail 28/headboard/footboard structure. Then the left hand bed rail 28 would be rotated 180 degrees and then used as the right hand bed rail 28. The effect of the 180 degree rotation would be to reposition the mattress support 30 from the first lower position to the second upper position (or vice versa). The right hand bed rail 28 would also be rotated and used as the left hand bed rail thereby accomplishing the same movement of the mattress support 30. After the bed rails 28 have been re-arranged as described above, the mattress support 30 will have been re-positioned from either the first lower position to the second upper position or vice versa.

I claim:

1. A hook assembly comprising a latitudinal axis bisecting a body into an upper portion above the latitudinal axis further comprising a first bi-directional pin engagement slot and a lower portion below the latitudinal axis further comprising a second bi-directional pin engagement slot, wherein both the upper portion and the lower portion and the first bi-directional pin engagement slot and the second bi-directional engagement slot are mirror images of one another.

2. The hook assembly of claim 1 wherein said first and second bi-directional pin engagement slots further comprise an upper interior slot and a lower interior slot.

3. The hook assembly of claim 2 wherein said upper interior slot and lower interior slot are in fluid contact with a central opening, wherein said upper interior slot, lower interior slot and central opening are configured to receive a pin from a bedpost.

4. The hook assembly of claim 3 wherein the body further comprises one or more apertures.

5. The hook assembly of claim 4 wherein the body further comprises a plurality of apertures.

6. The hook assembly of claim 1 wherein the hook assembly further comprises an integral construction comprised of a flat metal sheet.

7. A bed comprising a bed rail attached to a hook assembly, said hook assembly further comprising:
   a. a plurality of bi-directional pin engagement slots each comprising an upper interior slot and a lower interior slot, wherein said upper and lower interior slots are formed on either side of an apex extending from a body;
   b. a latitudinal axis bisecting the body into an upper portion above the latitudinal axis and a lower portion below the latitudinal axis, wherein the upper portion and the lower portion are mirror images of one another; and
   wherein the upper interior slot and the lower interior slot are located on opposite sides of a t-shaped extension extending from the body and the hook assembly is attached to said bed rail by one or more fasteners.

8. The bed of claim 7 wherein the upper portion comprises one of the plurality of bi-directional pin engagement slots, wherein said upper interior slot comprises a close-ended construction wherein one side of the slot is bounded by an outer distal boundary, the opposite side of the slot is bounded by an inner distal boundary and the closed end of the slot is bounded by the terminus.

9. The bed of claim 8 wherein the upper portion comprises one of the plurality of bi-directional pin engagement slots, wherein said lower interior slot comprises a close-ended construction wherein one side of the slot is bounded by an outer central boundary, the opposite side of the slot is bounded by an inner central boundary and the closed end of the slot is bounded by the terminus.

10. A bed rail attached to a hook assembly, said hook assembly comprising a latitudinal axis bisecting a body into an upper portion above the latitudinal axis further comprising a first bi-directional pin engagement slot and a lower portion below the latitudinal axis further comprising a second bi-directional pin engagement slot, wherein both the upper portion and the lower portion and the first bi-directional pin engagement slot and the second bi-directional engagement slot are mirror images of one another.

11. The hook assembly of claim 10 wherein said first and second bi-directional pin engagement slots further comprise an upper interior slot located on a first side of an apex extending from the body and a lower interior slot located on a second side of an apex extending from the body.

12. The hook assembly of claim 11 wherein said upper interior slot and lower interior slot are in fluid contact with a central opening, wherein said upper interior slot, lower interior slot and central opening are configured to receive a pin from a bedpost.

13. The hook assembly of claim 12 wherein the body further comprises one or more apertures.

14. The hook assembly of claim 13 wherein the body further comprises a plurality of apertures.

15. The hook assembly of claim 14 wherein the hook assembly further comprises an integral construction comprised of a flat metal sheet.

* * * * *